(12) United States Patent
Hu et al.

(10) Patent No.: US 8,092,106 B2
(45) Date of Patent: Jan. 10, 2012

(54) KEYBOARD WITH HOOK FOR HANGING KEYBOARD ON ANOTHER OBJECT

(75) Inventors: Yu-Quan Hu, Shenzhen (CN); Yong-Gang Jiang, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 745 days.

(21) Appl. No.: 12/238,412

(22) Filed: Sep. 25, 2008

(65) Prior Publication Data

US 2009/0168315 A1    Jul. 2, 2009

(30) Foreign Application Priority Data

Dec. 29, 2007   (CN) .......................... 2007 1 0203561

(51) Int. Cl.
*G06F 3/023* (2006.01)
*G06F 1/16* (2006.01)
(52) U.S. Cl. ......... 400/472; 248/339; 248/305; 400/717
(58) Field of Classification Search .................. 400/472, 400/715, 717; 248/339, 349, 305
See application file for complete search history.

(56) References Cited

U.S. PATENT DOCUMENTS

| | | | | | |
|---|---|---|---|---|---|
| 1,228,774 | A | * | 6/1917 | Hecht | 248/685 |
| 3,542,324 | A | * | 11/1970 | Willinger | 248/689 |
| 4,516,508 | A | * | 5/1985 | Kako et al. | 108/7 |
| 4,814,747 | A | * | 3/1989 | Wathor | 340/407.2 |
| 5,370,468 | A | | 12/1994 | Chern et al. | |
| 6,507,483 | B2 | * | 1/2003 | Oura et al. | 361/679.08 |
| 6,663,066 | B1 | * | 12/2003 | Hong | 248/231.41 |
| 6,679,463 | B1 | * | 1/2004 | Chen | 248/126 |
| 7,032,043 | B1 | * | 4/2006 | Kashiwagi et al. | 710/100 |
| 2005/0230583 | A1 | * | 10/2005 | Wu | 248/231.41 |

FOREIGN PATENT DOCUMENTS

| | | | |
|---|---|---|---|
| CN | 2182428 Y | | 11/1994 |
| CN | 2358263 Y | | 1/2000 |
| CN | 2426621 Y | | 4/2001 |
| JP | 07271472 A | * | 10/1995 |
| JP | 09006505 A | * | 1/1997 |
| JP | 11038167 A | * | 2/1999 |
| JP | 2000194478 A | * | 7/2000 |
| JP | 2001265487 A | * | 9/2001 |

* cited by examiner

*Primary Examiner* — Daniel J Colilla
(74) *Attorney, Agent, or Firm* — Altis Law Group, Inc.

(57) ABSTRACT

A keyboard includes a main body including a plurality of input keys and a hanger mounted on the main body including a hook for hanging the keyboard.

11 Claims, 4 Drawing Sheets

KEYBOARD WITH HOOK FOR HANGING KEYBOARD ON ANOTHER OBJECT

BACKGROUND

1. Field of the Invention

The present invention generally relates to information input apparatus, and particularly, to a keyboard.

2. Description of Related Art

Keyboards are popularly as input devices of computers and other information processing apparatus. Keyboards are usually located on upright platforms, such as tables, and connect to the computers or other information processing apparatus by cables. However, most keyboards occupy a comparative large area of the platform. Statistics have shown that the most dissatisfaction with keyboards is the occupying space taken up by the keyboard.

As such a need exist for a keyboard that can be easily and quickly stored after usage thereby freeing up space on the platform.

SUMMARY

A keyboard includes a main body including a plurality of input keys and a hanger mounted on the main body including a hook for hanging the keyboard.

Other systems, methods, features, and advantages of the present computer and keyboard thereof will be or become apparent to one with skill in the art upon examination of the following drawings and detailed description. It is intended that all such additional systems, methods, features, and advantages be included within this description, be within the scope of the present apparatus, and be protected by the accompanying claims.

DETAILED DESCRIPTION

Figure 1:
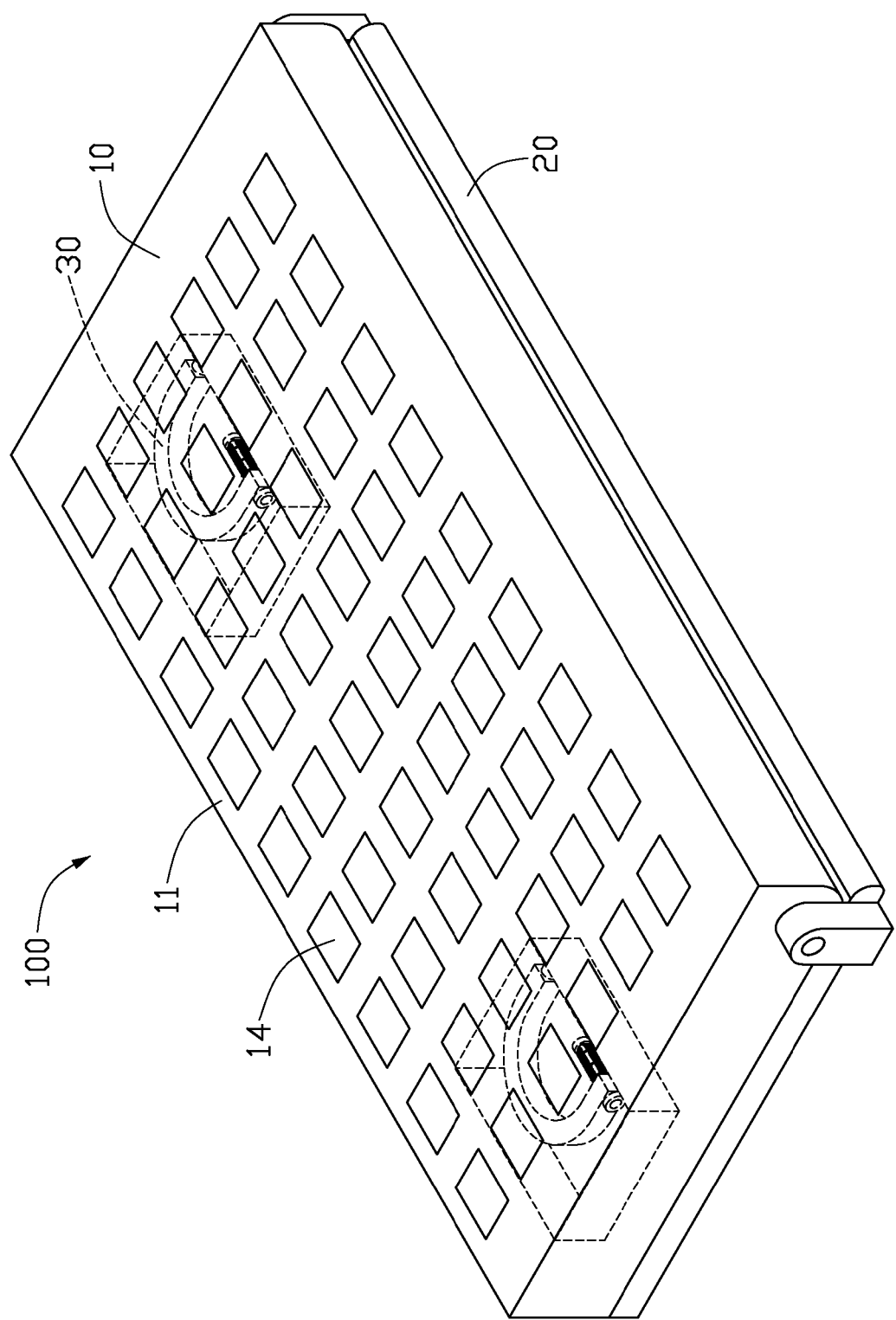
FIG. 1 is an isometric view of a keyboard in a folded state in accordance with an exemplary embodiment.
Figure 2:
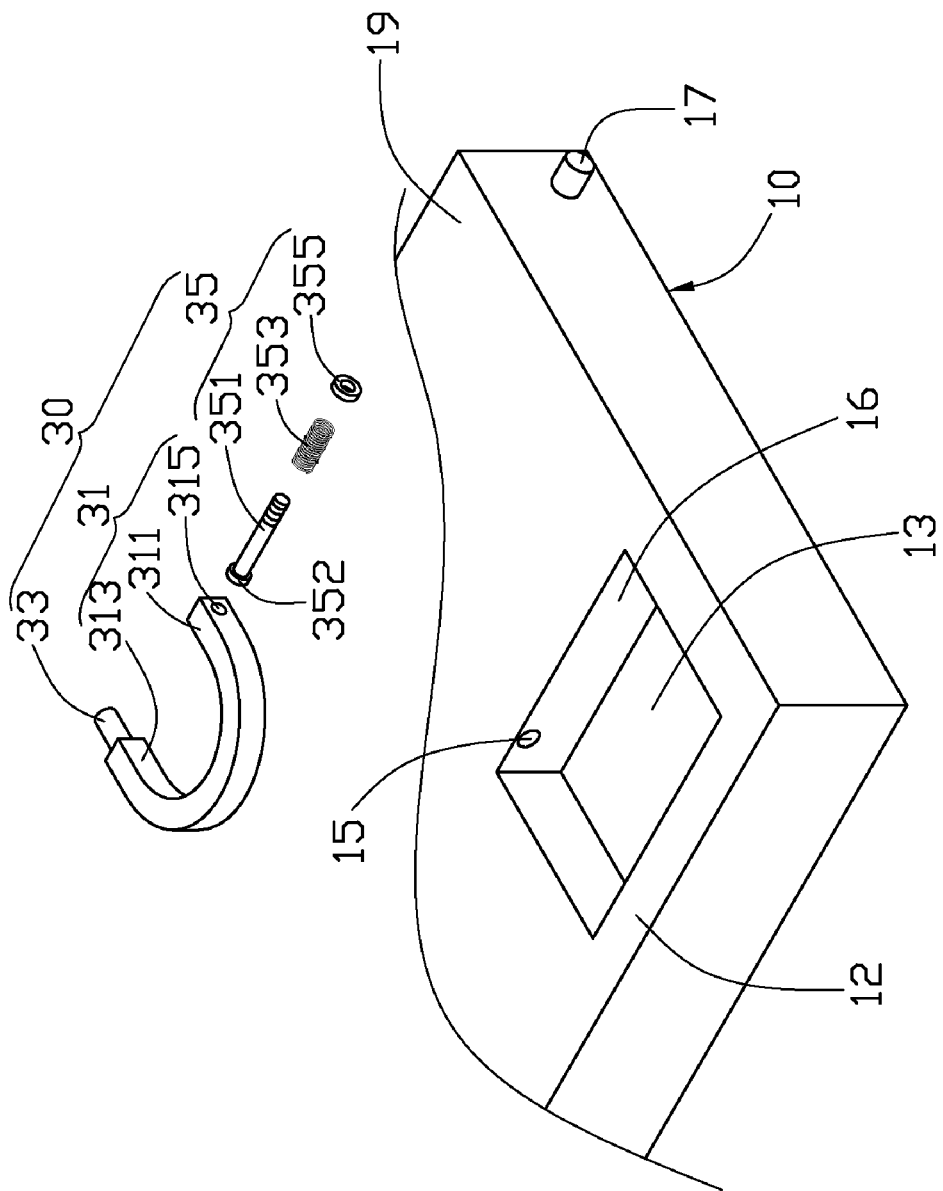
FIG. 2 is a partial exploded perspective view of the keyboard.
Figure 3:
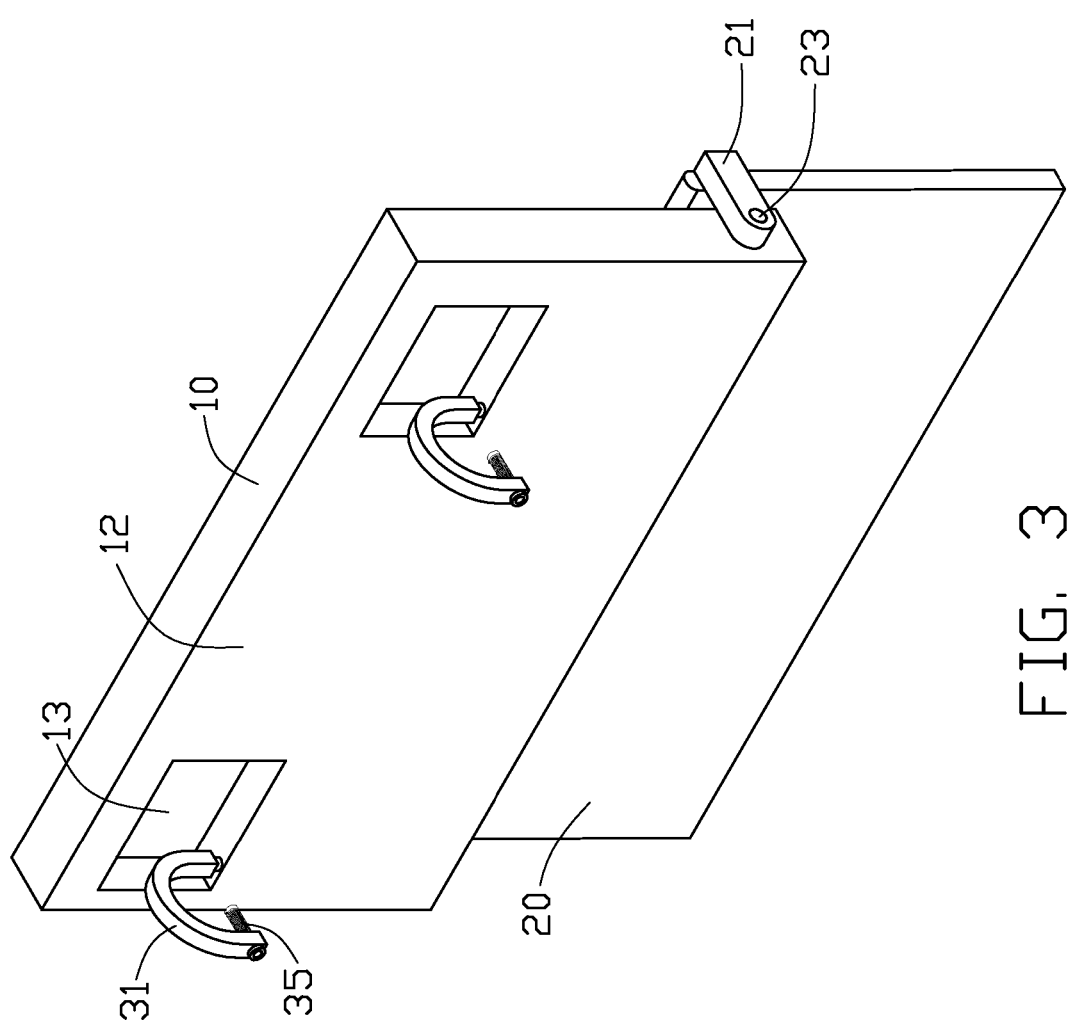
FIG. 3 is an isometric view of the keyboard in a unfolded state.

Referring to FIGS. 1, 2, and 3, a foldable keyboard 100 includes a flat main body 10, a keyboard extension flap 20 pivotally connected on the main body 10, and two hangers 30 pivotally connected to the main body 10. The foldable keyboard 100 can be in a folded state such that the main body 10 is folded over and on the keyboard extension flap 20 or in an unfolded state such that the keyboard extension flap 20 is folded out to generally be collinear in a plane of the main body 10.

The main body 10 includes a flat board 19 and a plurality of input keys 14 configured for inputting information. The flat board 19 includes a first surface 11 and a second surface 12 opposite to the first surface 11. The plurality of input keys 14 are disposed in the flat board 19 and extend out of the first surface 11. Two recesses 13 are defined in the second surface 12 for accommodating the two hangers 30 respectively. A blind hole 15 is defined in a side wall 16 of each recess 13. Two first pivot shafts 17 protrude from two opposite sides of the main body 10 and are located, respectively, at the furthest point possible from the recesses 13.

The keyboard extension flap 20 is pivotally rotatable around the first pivot shafts 17. Two hinges 21 protrude from opposite ends of the keyboard extension flap 20 corresponding to the two pivot shafts 17 respectively. Two mounting holes 23 are defined in the two hinges 21 for allowing the first pivot shafts 17 to rotatably pass through. Thus, the keyboard extension flap 20 can be switchable between the folded state and the unfolded state.

Two hangers 30 are accommodated in the two recesses 13 respectively. As the two hanger 30 have similar structures and functions, only one of the hangers 30 will be described hereinafter. The hanger 30 includes a hook 31, a second pivot shaft 33, and a resilient clip 35.

The hook 31 includes a free end 311 and a fixing end 313 opposite to the free end 311. A through hole 315 is defined in the free end 311 for allowing the resilient clip 35 to pass through. The fixing end 313 is rotatably received in the blind hole 15 of the recess 13.

The second pivot shaft 33 is mounted on the fixing end 313 of the hook 31, and pivotally assembled in the blind hole 15 of the main body 10. Therefore, the hanger 30 can be rotatably accommodated in the recess 13. The hook 31 is rotated and received in the recess 13 when the foldable keyboard 100 is in the folded state. Furthermore, the hook 31 can rotate and extend out of the recess 13 and also hooked onto the display 200 (shown in FIG. 4), thereby, hanging the foldable keyboard 100 on the display 200 while the foldable keyboard 100 is in the unfolded state.

The resilient clip 35 includes a bolt 351, an elastic member 353 sleeved on the bolt 351, and a nut 355 engaging with the bolt 351. The bolt 351 is inserted through the through hole 315, with the elastic member 353 compressed between a cap 352 of the bolt 351 and the free end 311 of the hook 31. The nut 353 is screwed onto the threaded part of the bolt 351. The distance between the cap 352 of the bolt 351 and the fixing end 313 of the hook 31 is adjustable by adjusting/turning the nut 353. The elastic member 353 should be of such length to keep the bolt 351 perpendicular to the free end 311 when the cap 352 is screwed, after a few turns, onto the bolt 351.

Figure 4:
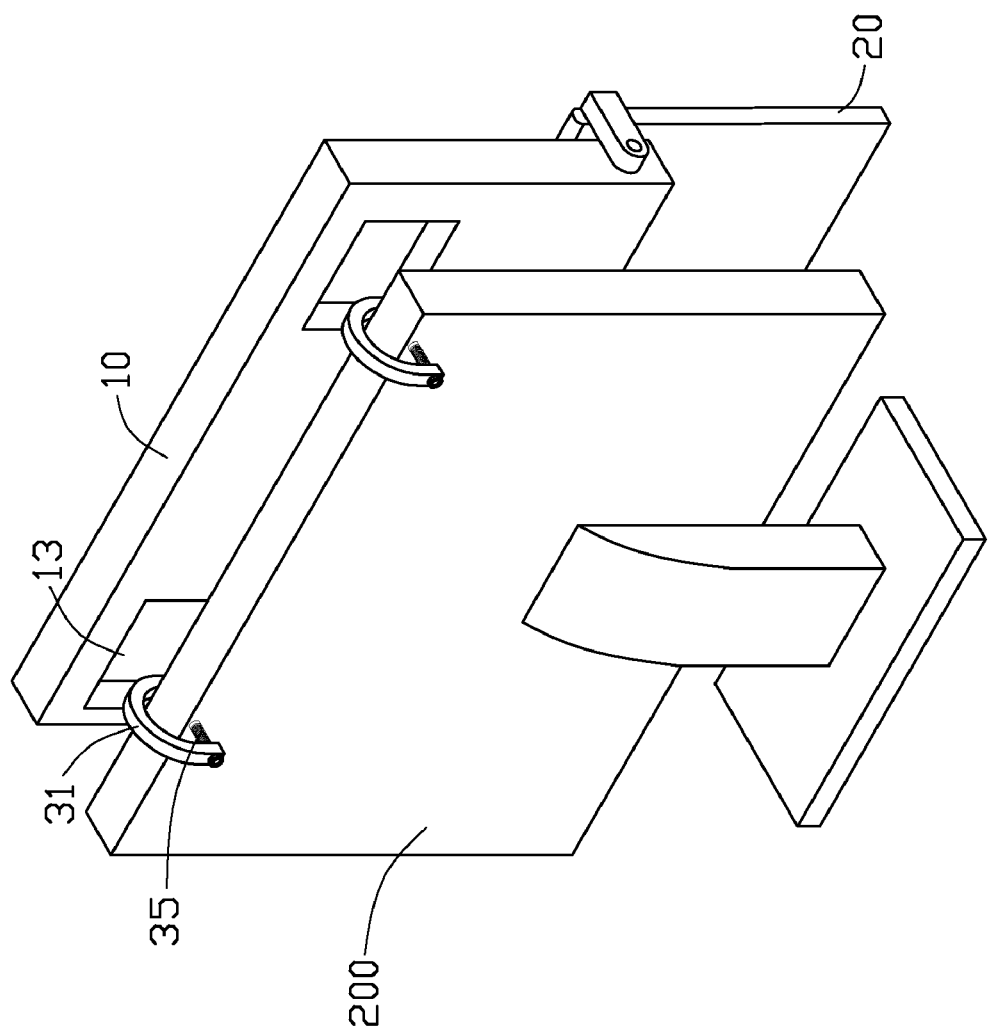
FIG. 4 is an isometric view showing that the keyboard hanging on a display.

As shown in FIG. 1, when the foldable keyboard 100 is in the folded state, the keyboard extension flap 20 is located under the main body 10, the hangers 30 are entirely received in the recesses 13. Referring to FIG. 4, to unfold the foldable keyboard 100: First, the keyboard extension flap 20 is rotated and folded out to generally lie in the plane of the main body 10; Second, the hooks 31 are rotated out of the recesses 13; Third, the foldable keyboard 100 is lifted such that the input keys of the foldable keyboard 100 face the screen (not shown) of the display 200, then the hook 31 is hooked to a top of the display 200, the nut 353 is adjusted to resiliently clasp the top of the display 200 between the cap 352 of the bolt 351 and the fixing end 313 of the hook 31. Thus, the foldable keyboard 100 is stably hung on the display 200 and does not occupy any desk space.

Moreover, when the foldable keyboard 100 is hung on the display 200, the keyboard extension flap 20 generally lies in the plane of the main body 10. Therefore, the foldable keyboard 100 can further be used as a cover of the screen, protecting the screen from dust.

The foregoing description of the exemplary embodiments of the invention has been presented only for the purposes of illustration and description and is not intended to be exhaustive or to limit the invention to the precise forms disclosed. Many modifications and variations are possible in light of the above teaching. The embodiments were chosen and described in order to explain the principles of the invention and their practical application so as to enable others skilled in the art to utilize the invention and various embodiments and with various modifications as are suited to the componenticular use contemplated. Alternative embodiments will become apparent to those skilled in the art to which the present invention pertains without decomponenting from its spirit and scope. Accordingly, the scope of the present invention is defined by the appended claims rather than the foregoing description and the exemplary embodiments described therein.

What is claimed is:

1. A keyboard comprising:
a main body comprising a plurality of input keys; and
a hanger mounted on the main body comprising a hook for hanging the keyboard on another object;
wherein the hook comprises a fixing end, a free end, and a resilient clip, the fixing end is pivotally mounted on the main body, the free end is opposite to the fixing end, the resilient clip is slidably mounted on the free end for adjusting the distance between the resilient clip and the fixing end.

2. The keyboard as claimed in claim 1, wherein the hook is pivotally mounted on the main body.

3. The keyboard as claimed in claim 2, wherein the main body defines a recess for receiving the hook.

4. The keyboard as claimed in claim 3, wherein the hanger further comprises a pivot shaft fixed at one end of the hook, a hole for receiving the pivot shaft is defined on a side wall of the recess.

5. The keyboard as claimed in claim 4, wherein the pivot shaft is disposed at the fixing end.

6. The keyboard as claimed in claim 1, wherein the hook defines a through hole, the resilient clip comprises a bolt, an elastic member sleeved on the bolt, and a nut engaged with the bolt, the bolt passes through the through hole, with the elastic member located between a cap of the bolt and the hook, and meshes with the nut.

7. The keyboard as claimed in claim 1, wherein the hook and the input keys are disposed at two opposite surfaces of the main body.

8. The keyboard as claimed in claim 1, the keyboard further comprising a keyboard extension flap pivoted on the main body and selectively located under the main body and lie in a plane defined by the main body.

9. A keyboard comprising:
input keys configured for inputting information; and
a hook capable of hanging the keyboard on another object;
wherein the hook comprises a fixing end, a free end, and a resilient clip, the fixing end is pivotally mounted on the main body, the free end is opposite to the fixing end, the resilient clip is slidably mounted on the free end for adjusting the distance between the resilient clip and the fixing end.

10. The keyboard as claimed in claim 9, wherein the hook is rotatably attached on the keyboard.

11. The keyboard as claimed in claim 9, wherein a recess is defined on the keyboard for receiving the hook.

* * * * *